Oct. 14, 1947.   C. I. GLASSBROOK ET AL   2,428,798
HYDROCARBON CONVERSION IN PRESENCE OF GEL CATALYSTS
Filed June 12, 1945   2 Sheets-Sheet 1

Clarence I. Glassbrook
Rowland C. Hansford
INVENTORS

BY Raymond W. Barclay
AGENT

Oct. 14, 1947.  C. I. GLASSBROOK ET AL  2,428,798
HYDROCARBON CONVERSION IN PRESENCE OF GEL CATALYSTS
Filed June 12, 1945   2 Sheets-Sheet 2

Clarence I. Glassbrook
Rowland C. Hansford
INVENTORS

BY Raymond W. Barclay
AGENT

Patented Oct. 14, 1947

2,428,798

UNITED STATES PATENT OFFICE 2,428,798

HYDROCARBON CONVERSION IN PRESENCE OF GEL CATALYSTS

Clarence I. Glassbrook, Glen Echo Farm, and Rowland C. Hansford, Woodbury, N. J., assignors to Socony-Vacuum Oil Company, Incorporated, a corporation of New York Application June 12, 1945, Serial No. 599,064

9 Claims. (Cl. 196—52)

1

This invention relates to an improved hydrogel and process for making the same. More particularly, the invention comprises a novel means for improving the physical and catalytic properties of inorganic oxide gels.

Such gels, particularly those containing silica are well known in the prior art and have been employed commercially as adsorbents and as catalysts in the cracking of petroleum hydrocarbons to yield lighter materials of the nature of gasoline. The gels have been generally produced by preparing a hydrosol of desired inorganic oxides and allowing such sols to set. The time which elapses before gelation occurs is dependent upon several variables including the temperature, the concentration of inorganic oxides, and the hydrogen ion concentration of the hydrosol. Heretofore, various methods of preparation have been used in an attempt to improve the catalytic properties of the resulting gel. Thus, gel-type catalysts of specific controlled composition have been found to possess improved catalytic properties in some instances. In a large number of cases, the surface of the gel has been altered by its method of formation or by coating or impregnating the gel with particular metals or metallic oxides to yield a product having improved catalytic properties.

In accordance with the present invention, a novel method has been found in which the prepared hydrogel has improved catalytic properties at the time of its formation. This invention has for its object the production of a hydrogel having an improved catalytic action. A further object is to produce a gel having an improved mechanical strength to facilitate handling and overcome excess breakage of the gel catalyst during service.

These objects are accomplished by the present invention in which a hydrosol is subjected to a uni-directional electrical field of orientation during the gelation process. The resulting gel after being washed free of water soluble salts and dried has improved physical and chemical properties as will be shown below.

By the term electrical field of orientation it is meant to include an electrostatic field and an electromagnetic field. These fields may either be applied singly or simultaneously. In the latter case, the two fields should preferably be placed at right angles to obtain the optimum advantages of increased catalytic efficiency and mechanical strength in the resulting treated gel. It is to be clearly understood that the subjection of a hydrosol or a hydrogel to an electromotive force that is a force causing a flow of current through the colloidal sol or gel is not to be included in the above definition. The latter phenomenon is well known to the colloid chemist, being referred to as cataphoresis or electrophoresis.

The invention will be more clearly understood

2 by reference to the accompanying drawings wherein:

Similar numerals indicate similar parts throughout the several views.

Using the apparatus shown in Figure 1, a hydrosol to be treated 1, is placed in a glass vessel 2 and two metal condenser plates 3 and 3' are placed above and below the hydrosol, said plates being connected to a battery source 4. One plate acquires a positive charge and the other a negative charge. A potential difference between the two plates is built up and maintained at a desired potential difference while the gel proceeds to set.

Figure 1:
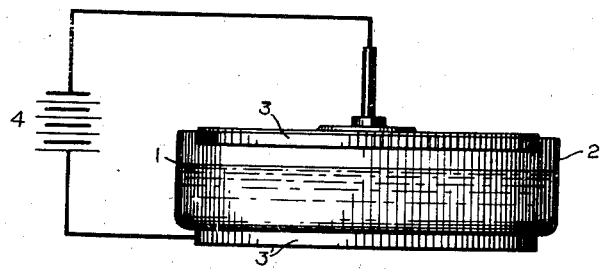
Figure 1 is an elevation of an apparatus for electrostatic treatment of a gel.
Figure 2:
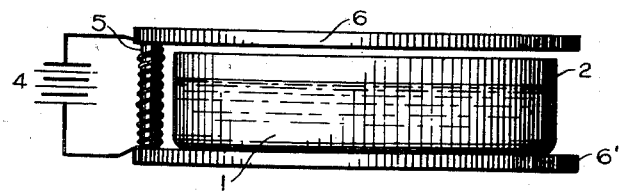
Figure 2 is an elevation of an apparatus for electromagnetic treatment of a gel.

If desired, the metallic plates designated as 3 and 3' in Figure 1 may be replaced as shown in Figure 2 by an electromagnet 5, equipped with extended pole pieces 6 and 6'. The electromagnet consists of an iron core wound with a large number of loops of wire, the ends of said wire being connected to a battery source 4. For purposes of illustration relatively few loops of wire have been shown. However, it will be understood that in practice a great number of such loops will surround the metallic core. The sol to be treated is exposed to the generated electromagnetic field by insertion between the extended pole pieces as shown, one pole piece lying over the sol and the other directly below the sol.

Figure 3:
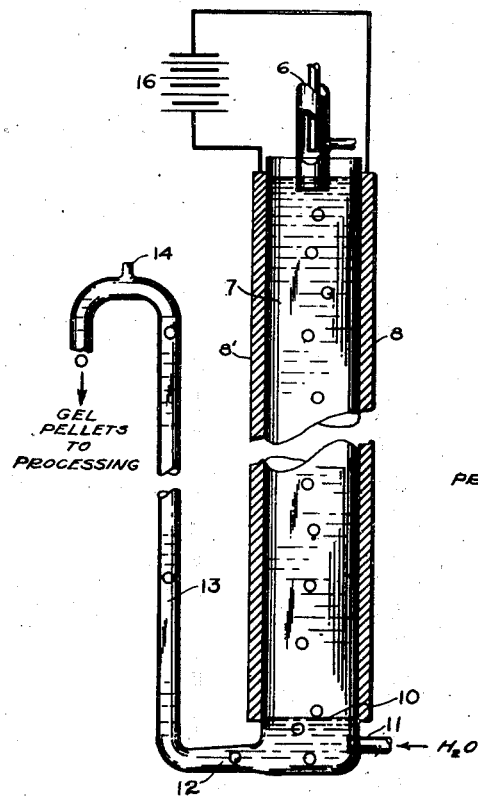
Figure 3 is an elevation partly in section of an apparatus for the electrostatic treatment of gel pellets.
Figure 5:
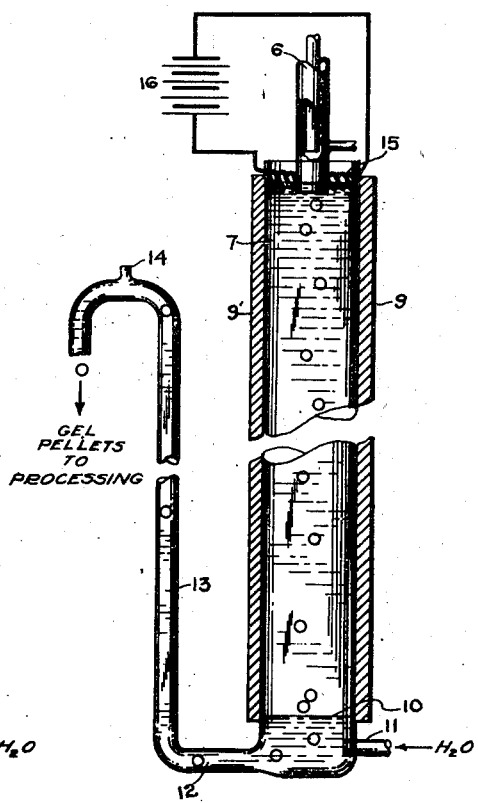
Figure 5 is an elevation partly in section of an apparatus for the electromagnetic treatment of gel pellets.

An alternative method of producing the improved gel-type catalyst is shown in Figures 3 and 5. Referring more particularly to the apparatus shown in Figure 3, the sol to be treated is prepared by allowing two impinging streams of liquid to meet and mix in the nozzle 6. The nature of the streams will depend largely upon the composition and properties of the sol desired. Globules of sol are ejected from the nozzle which projects into a column of water-immiscible fluid contained in tube 7. The tube is flanked by two metallic condenser plates 8 and 8' connected to a battery source 16. At the bottom of the tube is a layer of water which forms an interface 10 with the column of said fluid. Water is continuously supplied at inlet 11 and withdrawn through outlet 12. The interface at 10 is maintained by properly adjusting the height of the conduit 13 in correlation with the density of the fluid medium and rate at which water is supplied at 11. Vent 14 prevents siphoning action.

Figure 4:
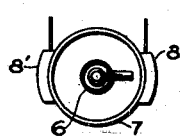
Figure 4 is a plan view of the apparatus shown in Figure 3.

The metallic condenser plates are preferably placed in direct contact with and partially surround the tube as shown in Figure 4, extending along its entire outer length to create an electrostatic field which surrounds the column of water-immiscible fluid.

Figure 6:
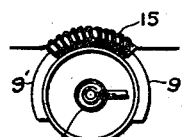
Figure 6 is a plan view of the apparatus shown in Figure 5.

The apparatus shown in Figure 5 is quite similar to that of Figure 3 with the exception that the gel pellets are subjected to an electromagnetic field during their period of gelation. The electromagnetic field is generated by an electromagnet consisting of a metallic core 15 surrounded by a number of loops of wire, the ends of which are connected to a battery source 16. Two extended pole pieces 9 and 9' flank the tube as shown in Figure 6 and project along its entire length to create an electromagnetic field surrounding the column of water-immiscible liquid.

The globules of sol after ejection from the nozzle pass through the column of water-immiscible fluid, the time of gelation being so regulated that they will set to spheroidal gel pellets in the fluid and under the influence of the uni-directional electrical field of orientation. The pellets are removed by the flow of water entering at 11 which carries them through outlets 12 and 13 to suitable washing and treating stages.

After being formed, the gel is washed free of water soluble salts and dried. If the methods of formation are such as to cause zeolitic sodium or other alkali metal to be included in the gel, these undesirable materials may be replaced by treatment with an ammonium salt solution or an inorganic multivalent metal salt solution such as those of aluminum, magnesium, manganese, zirconium, beryllium, thorium, and the like.

The following examples will serve to illustrate the invention:

Example 1

A hydrosol was prepared by adding 3109 parts by volume of dilute hydrochloric acid (.36 N) rapidly to a thoroughly agitated solution containing 505 parts by volume of a water-glass solution containing 0.221 gram $SiO_2$/cc. and 386 parts by volume of a sodium aluminate solution containing 0.0218 gram of $Al_2O_3$/cc. The hydrosol was poured into a glass tray which was placed on a metal plate as shown in Figure 1. Above the tray and as close to the hydrosol as possible was suspended another metal plate which covered the entire area of the tray. The two metal plates were connected across a D. C. potential of about 7500 volts, which gave a potential difference of about 1500 volts per cm. across the hydrosol. Gelation occurred at room temperature in about five minutes at a pH of about 7.

An identical hydrosol was prepared as described above and was poured into a similar glass tray in the absence of an electrostatic field and allowed to gel. The gelation time at room temperature was ten minutes.

The two hydrogels were separately processed under identical conditions throughout, by breaking up into small cubes, washing free of water-soluble chlorides, treating with an ammonium chloride solution to remove undesirable zeolitic sodium contained in the gel, and washing with water again. The hydrogels were then dried at 180° F. and gradually heated up to 1000° F. where they were maintained for sixteen hours and then at 1400° F. for another sixteen hours before testing for catalytic activity.

The activity of the catalyst is a measure of its capacity to catalyze the conversion of hydrocarbons and is here expressed as the percentage conversion of East Texas gas oil having an A. P. I. gravity of 35.4, and a boiling range of 435° F. to 715° F., to gasoline having an end point of 410° F. by passing volumes of said gas oil into the catalyst at 800° F. at substantially atmospheric pressure and a rate of 1.5 volumes of liquid oil per volume of catalyst per hour.

The activity of the catalyst prepared in the absence of the electrostatic field was 53.8, while the activity of the catalyst prepared under exactly the same conditions, but in the presence of the electrostatic field was 55.9, indicating an increase of over 2% in the amount of gas oil converted to gasoline.

Example 2

A solution was prepared from 364 cc. of aluminum sulfate solution containing 0.0396 gram $Al_2O_3$/cc., 184 cc. of 3.904 N. hydrochloric acid, and 1480 cc. of water. A second solution was prepared from 908 cc. of water glass containing 0.211 gram of $SiO_2$/cc. and 1120 cc. of water. The two solutions were placed in separate vessels and pumped to a mixing nozzle at equal rates of approximately 26 cc. per minute.

A hydrosol was produced and ejected from the mixing nozzle in the form of small globules into a column of oil of a depth of approximately five feet. Attached to the outside of a glass column containing the oil were two metal plates extending from the top to the bottom of the column as shown in Figure 3. A D. C. potential of about 6500 volts was applied across the metal plates while the hydrosol droplets were passing down through the oil column.

The hydrosol globules having a time of set at a pH of 7.0 and room temperature of from about 20 to 30 seconds, gelled in the oil column as spherical particles and entered a moving layer of water below the oil layer by which they were removed and carried to further processing steps of washing, treating with aluminum chloride solution and drying as in Example 1.

A comparative example was run under the same conditions with the same solution and treatment but in the absence of an electrostatic field. The activity of the latter catalyst was 51.8, while the activity of the catalyst prepared in the presence of the electrostatic field was 53.4.

While the above examples have shown the gelation of silica alumina hydrosols in the presence of electrostatic field, the invention contemplates the improvement in catalytic properties of other inorganic oxide hydrogels such as those of silica, silica-stannic oxide, silica-ceria, silica-alumina-stannic oxide, silica-alumina-ceria, and other gel-type catalysts which have been employed in the catalytic conversion of hydrocarbons.

In addition to the use of an electrostatic field as shown above, other orientating electrical fields, such as an electromagnetic field may be used to impart the improved catalytic characteristics to gel-type catalysts which are permitted to set under their influence. Thus, improved gel catalysts result if produced according to the above examples in which the metallic plates are replaced by two pole pieces which are extensions of a metallic core wound with a large number of loops of wire, the ends of the wire being connected to a source of potential so that the metal core serves as an electromagnet and its surrounding area as an electromagnetic field as shown in Figures 2 and 5. I desired, an electrostatic field and an electromagnetic field may be applied simultaneously to the hydrosol during its period of gelation. The two fields are then preferably placed at right angles so as to supplement each other, and give the maximum effects of orientation to the gel or sol being treated.

In carrying out the invention, a D. C. potential is used to give a uni-directional electrical field of orientation. While the invention is, of course, not limited by any theory, it is believed well recognized that dried gels of the type described above are highly amorphous in character. True gels are quite homogeneous in composition from a macro viewpoint, while gelatinous precipitates formed by coprecipitation of two or more hydrous oxides may be more or less non-homogeneous, depending upon the conditions under which they are produced. In all cases, however, there is a random or non-oriented distribution of hydrous oxides from a micro viewpoint. This is substantiated by the fact that these materials are amorphous to X-rays. In the presence of an electrostatic or an electromagnetic field, it is believed that an orientation of certain of the randomly distributed gel components is brought about to give a more specific catalytic surface than is usually produced in the absence of such a field.

Such a theory finds support in the fact that gel particles which have been allowed to gel in a uni-directional electrical field of orientation, are firmer and have greater mechanical strength than they would otherwise possess. Thus, under the influence of an electrical field, the components of the treated gel have become oriented to a more stable position, giving rise to a firmer and less easily broken product.

In general, the stronger the field of orientation, the greater will be the stress to yield a gel-type catalyst having a higher degree of catalytic efficiency. The time in which the hydrosol or hydrogel is present in the uni-directional electrical field of orientation may vary from a few seconds up to an extended period of time. As a general rule, larger periods of exposure of the hydrosol to the orientating field gives a catalyst having a greater activity.

We claim:
1. A process for the conversion of hydrocarbons which comprises contacting said hydrocarbons at conversion conditions of temperature and pressure with a catalyst produced by subjecting an inorganic oxide hydrosol capable of setting to a gel to a unidirectional electrical field of orientation during its period of gelation, washing the resulting gel free of water soluble salts and drying.

2. A process for the conversion of petroleum hydrocarbons which comprises contacting said hydrocarbons at conversion conditions of temperature and pressure with a catalyst produced by subjecting an inorganic oxide hydrosol capable of setting to a gel to a uni-directional electrostatic field during its period of gelation, washing the resulting gel free of water soluble salts and drying.

3. A process for the conversion of petroleum hydrocarbons which comprises contacting said hydrocarbons at conversion conditions of temperature and pressure with a catalyst produced by subjecting an inorganic oxide hydrosol capable of setting to a gel to a uni-directional electromagnetic field during its period of gelation and washing the resulting gel free of water soluble salts and drying.

4. A process for the conversion of petroleum hydrocarbons which comprises contacting petroleum hydrocarbons at conversion conditions of temperature and pressure with a catalyst produced by subjecting an inorganic oxide hydrosol capable of setting to a gel to a uni-directional electromagnetic field during its period of gelation, replacing the zeolitic alkali metal contained in the gel by treating with an ammonium salt solution, and drying the resulting product.

5. A process for the conversion of petroleum hydrocarbons which comprises contacting petroleum hydrocarbons at conversion conditions of temperature and pressure with a catalyst produced by subjecting an inorganic oxide hydrosol capable of setting to a gel to a uni-directional electrostatic field during its period of gelation, treating the gel so obtained with an ammonium salt solution and drying the resulting product.

6. A process for the conversion of petroleum hydrocarbons which comprises contacting petroleum hydrocarbons at conversion conditions of temperature and pressure with a catalyst produced by subjecting an inorganic oxide hydrosole capable of setting to a gel to a uni-directional electrostatic field during its period of gelation, treating the gel so obtained with an inorganic multivalent metal salt solution and drying the resulting product.

7. A process for the conversion of petroleum hydrocarbons which comprises contacting petroleum hydrocarbons at conversion conditions of temperature and pressure with a catalyst produced by subjecting an inorganic oxide hydrosol capable of setting to a gel to a uni-directional electromagnetic field during its period of gelation, treating the gel so obtained with an inorganic multivalent metal salt solution and drying the resulting product.

8. A process for the conversion of hydrocarbons which comprises contacting said hydrocarbons at conversion conditions of temperature and pressure with a catalyst produced by subjecting a silica-alumina hydrosol capable of setting to a gel to a uni-directional electrostatic field during its period of gelation, washing the resulting gel free of water soluble salts and drying.

9. A process for the conversion of hydrocarbons which comprises contacting said hydrocarbons at conversion conditions of temperature and pressure with a catalyst produced by subjecting a silica-alumina hydrosol capable of setting to a gel to a uni-directional electromagnetic field during its period of gelation, washing the resulting gel free of water soluble salts and drying.

CLARENCE I. GLASSBROOK.
ROWLAND C. HANSFORD.

REFERENCES CITED

The following references are of record in the file of this patent:

UNITED STATES PATENTS

| Number | Name | Date |
|---|---|---|
| Re. 21,690 | Bond | Jan. 14, 1941 |
| 1,939,647 | Arnold et al. | Dec. 19, 1933 |
| 2,382,239 | Lee | Aug. 14, 1945 |
| 2,370,200 | Shabaker | Feb. 27, 1945 |
| 2,089,966 | Kassner | Aug. 17, 1937 |
| 1,864,828 | Joffe | June 28, 1932 |
| 1,257,396 | Richardson | Feb. 26, 1918 |
| 2,384,942 | Marisic | Sept. 18, 1945 |

FOREIGN PATENTS

| Number | Country | Date |
|---|---|---|
| 417,501 | Great Britain | Sept. 28, 1934 |